(No Model.)

J. W. WILLCOXON.
NUT LOCK.

No. 470,088. Patented Mar. 1, 1892.

Witnesses:
Chas. A. Ford.
W. S. Duvall.

Inventor
Jno. W. Willcoxon.
By his Attorneys,
C. A. Snow & Co.

(No Model.)

J. W. WILLCOXON.
NUT LOCK.

No. 470,088. Patented Mar. 1, 1892.

Witnesses:
Chas. A. Ford.
W. S. Duvall.

Inventor
Jno. W. Willcoxon.
By his Attorneys,
C. A. Snow & Co.

United States Patent Office.

JOHN W. WILLCOXON, OF MANASSAS, VIRGINIA.

NUT-LOCK.

SPECIFICATION forming part of Letters Patent No. 470,088, dated March 1, 1892.

Application filed January 7, 1892. Serial No. 417,304. (No model.)

*To all whom it may concern:*

Be it known that I, JOHN W. WILLCOXON, a citizen of the United States, residing at Manassas, in the county of Prince William and State of Virginia, have invented a new and useful Nut-Lock, of which the following is a specification.

This invention relates to improvements in nut-locks, and to that particular class thereof in which a jam-nut is employed and adapted to jam against the crown of the main nut.

The objects of my invention are to improve the jam-nut, whereby it is itself locked against retrograde movement, and hence its efficiency as a locking-nut improved.

A further object of the invention is to secure these advantages in a cheap and simple manner.

With these objects in view the invention consists in certain features of construction hereinafter specified, and particularly pointed out in the claims.

Figure 1:
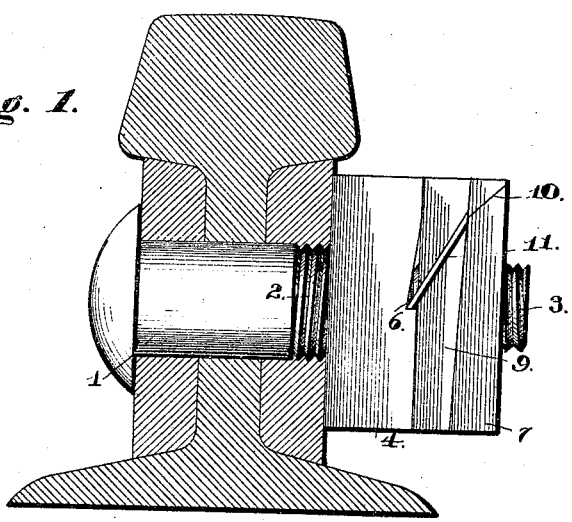
Figure 2:
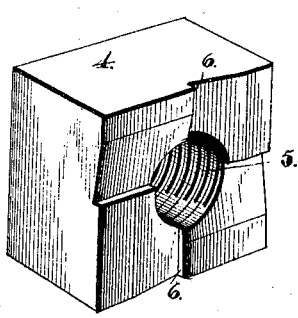
Figure 3:
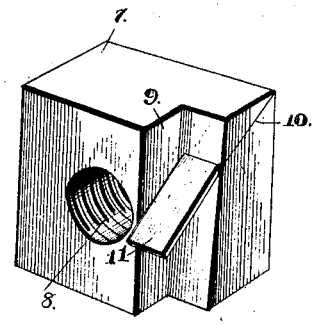
Figure 4:
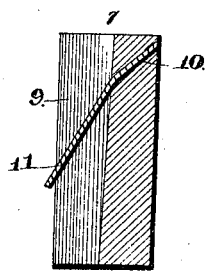
Figure 1:
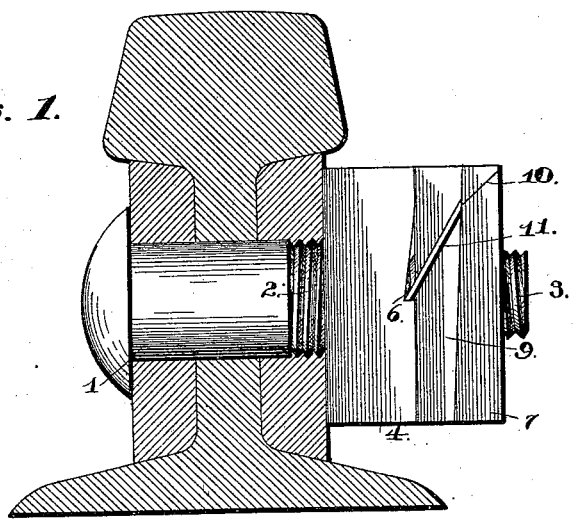
Figure 2:
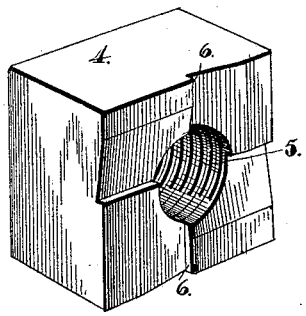
Figure 3:
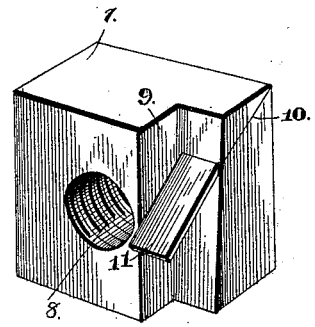
Figure 4:
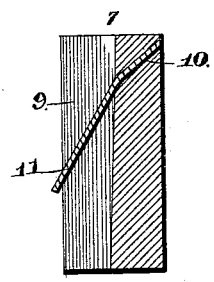

Referring to the drawings, Figure 1 is an elevation of a bolt, the same being mounted in the joint of a railroad-rail, the latter being viewed in cross-section and the nuts of the bolts being constructed in accordance with my invention. Fig. 2 is a detail of the main nut. Fig. 3 is a similar view of the jam-nut. Fig. 4 is a section of the latter nut through the spring locking pawl or tongue.

Like numerals of reference indicate like parts in all the figures of the drawings.

In practicing my invention I employ a bolt 1, which is provided with a right-hand thread 2 and a left-hand thread 3, in this instance the right-hand thread being located at the outer end; but, if desired, their locations may be reversed. As is usual, also, the bolt at the outer thread is somewhat reduced in diameter in order to permit of the passage thereover of the inner or main nut without engaging the threads of the same.

4 designates the inner or main nut, and the same in this instance is provided with the central left-hand threaded perforation 5 for the reception of the bolt and for operating upon the left-hand threads 2 thereof. In addition to these usual features the outer face or crown of the nut is provided with a series of radial notches or grooves 6. These grooves may be of any number desired, and therefore occur over the face of the nut as often as may be deemed expedient by the maker. In the present instance, however, I have deemed four sufficient to fully explain my invention. One wall of each groove is abrupt, while the opposite wall is inclined, so that a pawl moving over the face of the nut in one direction would not be engaged by the grooves, but will readily ride over the same, while when moving in the opposite direction such engagement would surely take place, and the movement of the pawl in such retrograde direction would be immediately arrested.

The jam or locking nut has a central threaded bolt-receiving perforation 8, the threads of which are in this instance right-hand, so as to agree with the outer threads 3 of the bolt, and thus when said nut is run down upon the threads 3 it acts as a jam-nut against the crown of the main nut 4. The inner face of the jam-nut at one side of its opening is provided with a recess or cut-away portion 9, and the edge of the nut at one end of the recess is provided with an inclined kerf or slit 10. In this slit is seated a sheet-metal spring tongue or pawl 11, the free end of the pawl projecting in an inclined manner a slight distance beyond the plane of the inner face of the nut. In order to secure the pawl in position in the kerf or slit the metal surrounding the same is upset, as shown, hence closely clamping the pawl and preventing it from working loose and also constituting an exceedingly cheap, as well as effective, means for securing the pawl.

The operation will be obvious from the above description and may be briefly stated as follows: The main nut having been run down by rotation to the left to a proper position upon the bolt and tightened, the jam-nut is now run down against the crown of the main nut, the free end of the pawl readily riding over the notches in the crown and permitting the jam-nut to be forced against the crown, so as to perform its usual function as such. It will be seen, however, that any attempt to retrograde the jam-nut or rotate it to the left, so as to release the main nut, will be effectually resisted by the pawl, the free end of which, as will be apparent, will have engaged with an adjacent notch or groove of the main nut. In this manner a most effective lock is formed—one in which the strength and power of the jam-nut are fully utilized and all danger of the jam-nut working loose obviated. Furthermore, the nuts may be removed from the bolts without injury to the jam-nut or any impairment whatever for its future use, such operation merely requiring the insertion of a suitable tool into the end of the recess of the jam-nut and a consequent forcing by said tool of the pawl out of engagement with the notch or groove of the main nut. Such will permit of the retrograde movement upon the part of the jam-nut until the spring tongue or pawl is beyond the danger of engaging with the grooves or notches, when the tool may be removed and the jam-nut removed in the ordinary manner.

Having described my invention, what I claim is—

1. The combination, with the bolt having the right and left hand threads, of the main nut for engaging the inner threads, the crown of said nut being provided with radial inclined notches or grooves, and the jam-nut adapted for engaging the outer threads of the bolt and provided at one side of its opening and upon its inner face with a recess, the edge of the nut at one end of the recess having an inclined kerf and a spring-pawl seated in the kerf and secured by the upset metal of the nut, the free end of the pawl projecting slightly beyond the face of the jam-nut and adapted to engage the grooves of the main nut, substantially as specified.

2. The combination, with the bolt having the right and left hand threads, of the inner main bolt mounted upon the inner threads and having its crown provided with a series of radial notches, and the outer jam-nut mounted on the outer threads of the bolt and having its inner face provided with a sheet-metal inclined spring-pawl secured to the nut, the inner end of the pawl projecting beyond the inner face of the jam-nut, substantially as specified.

In testimony that I claim the foregoing as my own I have hereto affixed my signature in the presence of two witnesses.

JOHN W. WILLCOXON.

Witnesses:
   J. T. GOODWIN,
   A. FLAHERTY.